United States Patent
Baleine et al.

(10) Patent No.: US 11,796,797 B2
(45) Date of Patent: Oct. 24, 2023

(54) WAVEFRONT ERROR CORRECTION OF A CONFORMAL OPTICAL COMPONENT USING A PLANAR LENS

(71) Applicant: Lockheed Martin Corporation, Bethesda, MD (US)

(72) Inventors: Clara R. Baleine, Orlando, FL (US); Patricia S. Sharek, Mount Dora, FL (US); Erwan A. P. Baleine, Orlando, FL (US); Johann M. Veras, Orlando, FL (US); Don A. Larson, Kennedale, TX (US); Robert J. McCarty, Plano, TX (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 328 days.

(21) Appl. No.: 16/812,975

(22) Filed: Mar. 9, 2020

(65) Prior Publication Data
US 2021/0278662 A1    Sep. 9, 2021

(51) Int. Cl.
*G02B 27/00* (2006.01)
*G02B 3/00* (2006.01)
*G02B 7/00* (2021.01)

(52) U.S. Cl.
CPC ....... *G02B 27/0025* (2013.01); *G02B 3/0056* (2013.01); *G02B 7/003* (2013.01)

(58) Field of Classification Search
CPC ... G02B 27/0025; G02B 3/0056; G02B 7/003
(Continued)

(56) References Cited

U.S. PATENT DOCUMENTS 5,946,143 A * 8/1999 Whalen ............. G02B 27/0068
  359/728
6,040,936 A    3/2000 Kim et al.
(Continued)

FOREIGN PATENT DOCUMENTS

| EP | 2426540 A1 | 3/2012 |
| JP | 2008117664 A | 5/2008 |
| KR | 20020031092 A | 4/2002 |

OTHER PUBLICATIONS

Author Unknown, "Adaptive optics," Wikipedia, last modified Sep. 8, 2014, accessed on Sep. 23, 2014, Wikimedia Foundation, Inc., 6 pages.
(Continued)

*Primary Examiner* — Wyatt A Stoffa
*Assistant Examiner* — Mitchell T Oestreich
(74) *Attorney, Agent, or Firm* — Terry M. Sanks, Esq.; Beusse Sanks, PLLC (57) ABSTRACT

The embodiments relate to systems and methods for wavefront error (WFE) correction of a conformal optical component using a planar lens. The embodiments include a conformal optical component transmissive to electromagnetic radiation (EMR), which is propagated through the conformal optical component along a path axis. The conformal optical component is rotationally asymmetric about the path axis. A planar corrector lens is configured to correct a WFE of the conformal optical component. The planar corrector lens defines a lens axis. Accordingly, use of a single planar corrector lens for WFE correction of a conformal optical component reduces bulk and manufacturing complexity.

19 Claims, 10 Drawing Sheets

(58) Field of Classification Search
USPC .......................................................... 359/554
See application file for complete search history.

(56) References Cited

U.S. PATENT DOCUMENTS

| | | | |
|---|---|---|---|
| 7,173,767 | B2 | 2/2007 | Satzke |
| 7,352,452 | B2 | 4/2008 | Wegmann et al. |
| 8,273,832 | B2 | 9/2012 | McCloskey et al. |
| 9,340,446 | B1 * | 5/2016 | Baleine ................ G02B 3/0087 |
| 9,772,255 | B1 * | 9/2017 | Tener ................. G01M 11/0271 |
| 10,656,049 | B1 | 5/2020 | Tener et al. |
| 2003/0081722 | A1 | 5/2003 | Kandaka et al. |
| 2004/0061868 | A1 | 4/2004 | Chapman et al. |
| 2006/0018594 | A1 | 1/2006 | Sugitatsu et al. |
| 2006/0171033 | A1 | 8/2006 | Schreder et al. |
| 2006/0281018 | A1 | 12/2006 | Tomaru |
| 2008/0106789 | A1 | 5/2008 | Hirai et al. |
| 2008/0228177 | A1 | 9/2008 | Moritz et al. |
| 2010/0209857 | A1 | 8/2010 | Martinez |
| 2012/0229784 | A1 | 9/2012 | Rocktaeschel et al. |
| 2012/0310340 | A1 | 12/2012 | Knox et al. |
| 2013/0141707 | A1 | 6/2013 | Baer et al. |
| 2013/0170044 | A1 | 7/2013 | Mont et al. |
| 2015/0085096 | A1 | 3/2015 | Smits |
| 2015/0241603 | A1 | 8/2015 | Fujii et al. |

OTHER PUBLICATIONS

Author Unknown, "Code V: What's New," accessed Oct. 18, 2017, https://www.synopsys.com/optical-solutions/codev/codev-whatsnew.html, Synopsys, Inc., pp. 1-4.
Krug, Peter A. et al., "Directly photoinscribed refractive index change and Bragg gratings in Ohara WMS-15 glass ceramics," Applied Optics, vol. 48, Issue 18, Jun. 20, 2009, pp. 3429-3437.
Non-Final Office Action for U.S. Appl. No. 14/556,517, dated Jun. 1, 2016, 8 pages.
Final Office Action for U.S. Appl. No. 14/556,517, dated Dec. 21, 2016, 10 pages.
Notice of Allowance for U.S. Appl. No. 14/556,517, dated May 26, 2017, 8 pages.
Non-Final Office Action for U.S. Appl. No. 15/686,641, dated Sep. 6, 2019, 10 pages.
Notice of Allowance for U.S. Appl. No. 15/686,641, dated Jan. 15, 2020, 7 pages.
Non-Final Office Action for U.S. Appl. No. 15/373,120, dated Aug. 9, 2019, 14 pages.
Final Office Action for U.S. Appl. No. 15/373,120, dated Dec. 6, 2019, 18 pages.
Advisory Action and AFCP 2.0 Decision for U.S. Appl. No. 15/373,120, dated Feb. 18, 2020, 4 pages.
Non-Final Office Action for U.S. Appl. No. 15/373,120, dated Mar. 5, 2020, 15 pages.
Non-Final Office Action for U.S. Appl. No. 15/373,198, dated Nov. 1, 2018, 11 pages.
Final Office Action for U.S. Appl. No. 15/373,198, dated Oct. 21, 2019, 11 pages.
Advisory Action for U.S. Appl. No. 15/373,198, dated Mar. 27, 2020, 3 pages.
International Search Report and Written Opinion for International Patent Application No. PCT/US2021/021122, dated Jun. 29, 2021, 10 pages.
Notice of Allowance for U.S. Appl. No. 16/849,047, dated Jul. 26, 2021, 8 pages.
Final Office Action for U.S. Appl. No. 15/373,120, dated Sep. 14, 2020, 19 pages.
Advisory Action for U.S. Appl. No. 15/373,120, dated Nov. 18, 2020, 3 pages.
Notice of Allowance for U.S. Appl. No. 15/373,198, dated Dec. 8, 2020, 8 pages.
U.S. Appl. No. 16/849,047, filed Apr. 15, 2020.
U.S. Appl. No. 15/373,120, filed Dec. 8, 2016.
U.S. Appl. No. 15/373,198, filed Dec. 8, 2016.
Notice of Allowance and Examiner-Initiated Interview Summary for U.S. Appl. No. 15/373,120, dated Dec. 18, 2020, 13 pages.
Corrected Notice of Allowability for U.S. Appl. No. 15/373,120, dated Jan. 29, 2021, 6 pages.

* cited by examiner

WAVEFRONT ERROR CORRECTION OF A CONFORMAL OPTICAL COMPONENT USING A PLANAR LENS

TECHNICAL FIELD

The embodiments relate to optical systems and, in particular, to correcting downstream wavefront error of a conformal optical component using a planar lens.

BACKGROUND

A conformal optical component has external surfaces that follow a shape of a host platform (e.g., for aerodynamic applications). For example, conformal optical components are used on vehicles (e.g., aircraft), to alter aerodynamic drag and/or increase difficulty of detection by radar systems. Optical elements that direct electromagnetic radiation (EMR) along an optical path inevitably introduce some aberrations in the wavefront of the EMR, and conformal shapes in particular degrade optical performance, causing significant optical aberrations. Such aberrations will be referred to herein as wavefront error (WFE). WFE degrades the performance of components in the optical path that utilize the EMR, such as a focal plane array or other sensor. Further, surface contours and/or orientation of the conformal optical component may result in a rotational asymmetric path through the conformal optical component to a detector, which may further contribute to wavefront error.

A corrector lens may be used to correct for such wavefront error. However, current correction solutions may be bulky, expensive, and/or difficult to manufacture, etc. For example, conventional lenses are generally curved, thick, and rotationally symmetric. Correcting WFE of rotationally asymmetric optical components using conventional lenses usually requires multiple lenses. Accordingly, systems that use such conventional lens solutions are relatively bulky, especially in certain applications (e.g., aircraft).

Other potential solutions are generally complex and/or require unusual shapes that are difficult to fabricate using conventional grinding and/or polishing approaches.

SUMMARY

The embodiments relate to systems and methods for wavefront error (WFE) correction of a conformal optical component using a planar lens. The embodiments include a conformal optical component transmissive to electromagnetic radiation (EMR), which is propagated through the conformal optical component along a path axis. The conformal optical component is rotationally asymmetric about the path axis. A planar corrector lens is configured to correct a WFE of the conformal optical component. The planar corrector lens defines a lens axis. Accordingly, use of a single planar corrector lens for WFE correction of a conformal optical component reduces bulk and manufacturing complexity.

In one embodiment, an optical system includes a conformal optical component transmissive to EMR and a planar corrector lens configured to correct a WFE of EMR propagated through the conformal optical component along a path axis through the planar corrector lens to a detector. The planar corrector lens defines a lens axis. The conformal optical component is rotationally asymmetric about the path axis.

In another embodiment, a method for correcting a WFE includes initiating, by a processor, an interferometer to determine a WFE of EMR downstream of a conformal optical component and a planar corrector lens. The planar corrector lens defines a lens axis. The EMR is propagated through the conformal optical component along a path axis. The conformal optical component is rotationally asymmetric about the path axis. The method further includes determining, by the processor, a refractive index prescription that reduces the wavefront error. The method further includes controlling, by the processor, an energy source to direct a beam of energy at a surface of the planar corrector lens in accordance with the refractive index prescription to alter the surface to change an index of refraction at multiple locations on the surface.

In another embodiment, a system for WFE correction includes an interferometer configured to determine a WFE of an EMR downstream of a conformal optical component and a planar corrector lens. The planar corrector lens defines a lens axis. The EMR is propagated through the conformal optical component along a path axis. The conformal optical component is rotationally asymmetric about the path axis. The system further includes a processor configured to determine a refractive index prescription that reduces the wavefront error. The system further includes an energy source configured to direct a beam of energy at a surface of the planar corrector lens in accordance with the refractive index prescription to alter the surface to change an index of refraction at multiple locations on the surface.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first layer" and "second layer," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The phrase "surface" as used herein refers to an outermost portion of an item, and includes a thickness of the outermost portion of the item. The precise thickness is generally not relevant to the embodiments, unless otherwise discussed herein. For example, a layer of material has a surface which includes the outermost portion of the layer of material as well as some depth into the layer of material, and the depth may be relatively shallow, or may extend substantially into the layer of material. The sub-wavelength openings discussed herein are formed in the surface, but whether the depth of the sub-wavelength openings extends past the depth of the surface or not is generally not relevant to the embodiments.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The use herein of "proximate" means at, next to, or near.

The embodiments include the generation of gradient-index (GRIN) optics. Mechanisms for generating GRIN optics in a surface of a material are disclosed, for example, in U.S. Pat. Nos. 9,340,446 and 9,772,255, the contents of which are hereby incorporated herein by reference.

The embodiments relate to optical systems and, in particular, to a planar GRIN lens (may also be referred to herein as metasurfaces, metalenses, etc.) for correcting wavefront error (WFE) of a conformal optical component. The embodiments include at least one conformal optical component with surface portions that are transmissive to electromagnetic radiation (EMR). The embodiments include optical components with sub-wavelength openings in the surface of the planar corrector lens that change a refractive index at the air/surface interface to correct for WFE of the conformal optical component.

A desired refractive index $n_{eff}$ can also be formed by sub-wavelength openings according to:

$$n_{eff} = n_1 \ast f_1 + n_2 \ast f_2 + n_N \ast f_N$$

where $n_1$, $n_2$, $n_N$ are the refractive indices of different materials, and $f_1$, $f_2$, $f_N$ are respective filling fractions. It is noted that many different patterns can be used to achieve the desired change in refractive index.

A pattern of sub-wavelength openings at a particular filling fraction defined by a diameter D of the sub-wavelength openings and a distance L between the sub-wavelength openings formed in the surface of a medium can alter the refractive index of the medium. The phrase "sub-wavelength" refers to opening diameters less than the wavelengths at issue. For example, the examples herein are discussed in the context of wavelengths in the 3 micrometer (μm) (i.e., 3000 nanometers (nm)) to 5 μm (i.e., 5000 nm) range, and thus, sub-wavelength openings refer to openings having a diameter less than 3000 nm. In particular, a desired refractive index $n_{eff}$ can be formed in a material by solving for D and L in accordance with the following formula for a hexagonal pattern of sub-wavelength openings:

$$n_{eff} = n_{substrate} + \frac{\pi D^2}{2\sqrt{3} \cdot L^2}(n_{air} - n_{substrate})$$

wherein $n_{air}$ is the refractive index of air (assuming air is the first medium), $n_{substrate}$ is the refractive index of the second medium, D is a diameter of the sub-wavelength openings, and L is a pitch that identifies a distance between the center of the sub-wavelength openings.

Disclosed herein is a GRIN planar corrector lens (may also be referred to as a phase corrector). In certain embodiments, the planar corrector lens is fabricated directly onto a substrate (e.g., flat optic, wafer, etc.) using lithographic tools (e.g., e-beam, UV lithography, nano imprinting lithography, etc.). Lithography may provide a high throughput and easy fabrication (as compared to traditional optical correction elements). In contrast to other solutions that require complex shapes/curvatures, represented as Δt, to refract the light and correct for the output phase difference, the planar corrector lens is engineered by controlling the refractive index (Δn) across a flat mask, while keeping the thickness constant so that there is no curvature:

$$\Delta \Phi = \frac{2\pi}{\lambda}(\Delta n * t)$$

Compared to other solutions, the planar corrector lens does not require complex curved surfaces that are difficult to fabricate, uses high throughput lithographic techniques, is etched directly onto the substrate material (minimizing potential delamination issues), is lower cost, and/or is easier to fabricate.

Figure 1:
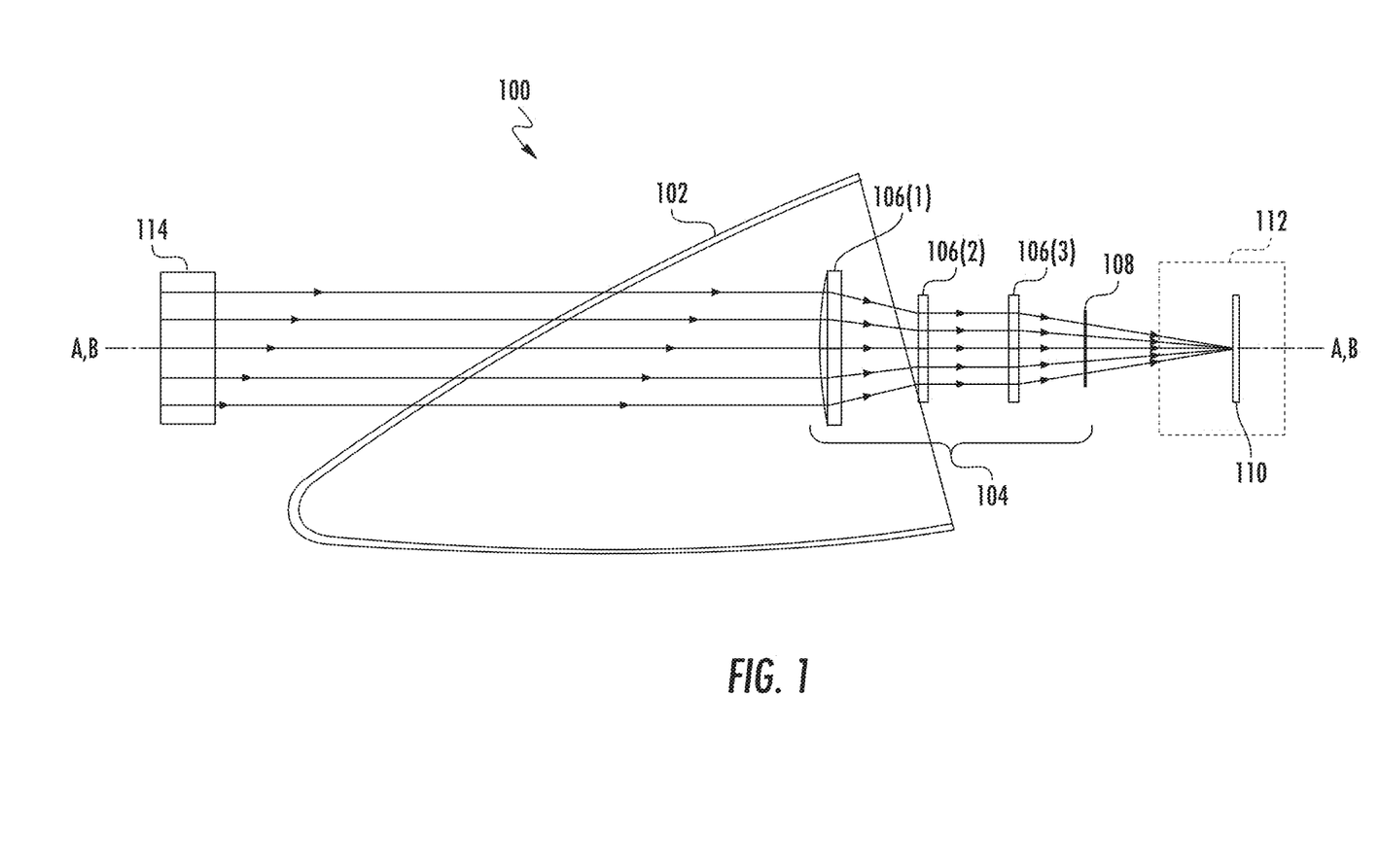
FIG. 1 is a cross-sectional side view of an optical system including a conformal optical component and a planar corrector lens.

FIG. 1 is a cross-sectional side view of an optical system 100 including a conformal optical component 102, an objective lens assembly 104 including objective lenses 106(1)-106(3) (referred to generally herein as objective lenses 106) and a planar corrector lens 108 (may also be referred to as a flat corrector lens, etc.). In certain embodiments, the optical system 100 includes a detector 110 which may be part of a camera 112. The optical system 100 is configured to receive EMR from a target 114 through the conformal optical component 102 and the objective lens assembly 104 to the detector 110. The planar corrector lens 108 is configured to correct for any WFE produced by the conformal optical component 102 and/or one or more of the objective lenses 106 in the objective lens assembly 104. The detector 110 (e.g., a focal plane array) is configured to capture an image based on the EMR with corrected wavefront.

The conformal optical component 102 is transmissive to EMR. The EMR is propagated through the conformal optical component 102 to the planar corrector lens 108 along a path axis A. In certain embodiments, the conformal optical component 102 includes a conformal optical window and/or a conformal dome. In certain embodiments, the conformal optical component 102 has a rotationally asymmetric shape. In other embodiments, the conformal optical component 102 has a rotationally symmetric shape but in a rotationally asymmetric orientation about the path axis A. In other words, the conformal optical component 102 is rotationally asymmetric about the path axis. In certain embodiments, the conformal optical component 102 may include a shape that is conical, pyramidal, and/or cylindrical, etc. Further, in certain embodiments, the conformal optical component 102 is a single integral component. In other embodiments, the conformal optical component 102 includes a plurality of optical components.

In certain embodiments, the objective lens assembly 104 includes the plurality of objective lenses 106 including the planar corrector lens 108. Each of the objective lenses 106 and the planar corrector lens 108 are transmissive to EMR emissions. For example, as shown, the objective lens assembly 104 includes the first objective lens 106(1), the second objective lens 106(2), the third objective lens 106(3), and the planar corrector lens 108. The planar corrector lens 108 is positioned proximate the detector 110 (e.g., in between the objective lenses 106(1)-106(3) and the detector 110) to correct any WFE potentially introduced by either of the conformal optical component 102 and/or the objective lenses 106. In other words, the planar corrector lens 108 is configured to correct a WFE of the EMR propagated through the conformal optical component 102 to the detector 110.

The planar corrector lens 108 defines a lens axis B. In certain embodiments, the lens axis B is aligned with the path axis A.

In certain embodiments, the planar corrector lens 108 includes a GRIN lens. In certain embodiments, the planar corrector lens 108 includes a GRIN surface etched onto a substrate. In certain embodiments, the planar corrector lens 108 includes a GRIN coating attached to a substrate. In certain embodiments, the planar corrector lens 108 includes a thickness of less than 10 mm (e.g., about 0.5 mm).

In certain embodiments, the optical system 100 is configured for one or more of a variety of types of EMR emissions, such as laser radiation, infrared radiation, ultraviolet, visible (light), etc. For example, in certain embodiments, the EMR includes at least one of mid-wave infrared radiation (MWIR) or long-wave infrared radiation (LWIR). The embodiments are generally designed for use in a particular bandwidth of light, referred to herein as the selected band of EMR, and could include, by way of non-limiting example, short-wave infrared radiation (IR), mid-wave IR, long-wave IR, ultraviolet, visible light, or the like. Such bands may include, but are not limited to, a band of wavelengths from 30 µm to 1 mm, from 3 µm to 30 µm, from 700 nm to 3 µm, from 400 nm to 700 nm, from 200 nm to 400 nm, from 1.4 µm to 3 µm, from 3 µm to 8 µm, from 8 µm to 15 µm, and/or from 15 µm to 1000 µm.

Although not illustrated, the optical system 100 may also include one or more lenses and/or one or more reflectors positioned in the light path between the target 114 and the detector 110 to focus or otherwise manipulate the EMR emissions for delivery through the optical system 100.

Figure 2A:
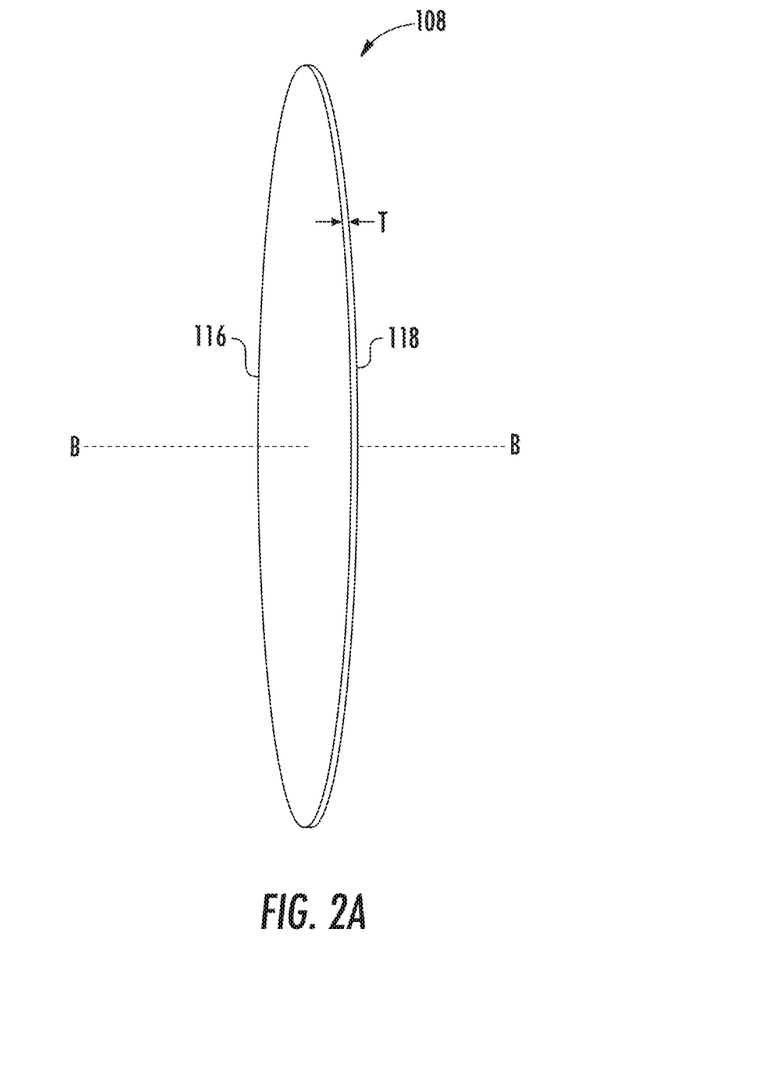
FIG. 2A is a perspective view of the planar corrector lens of FIG. 1.
Figure 2B:
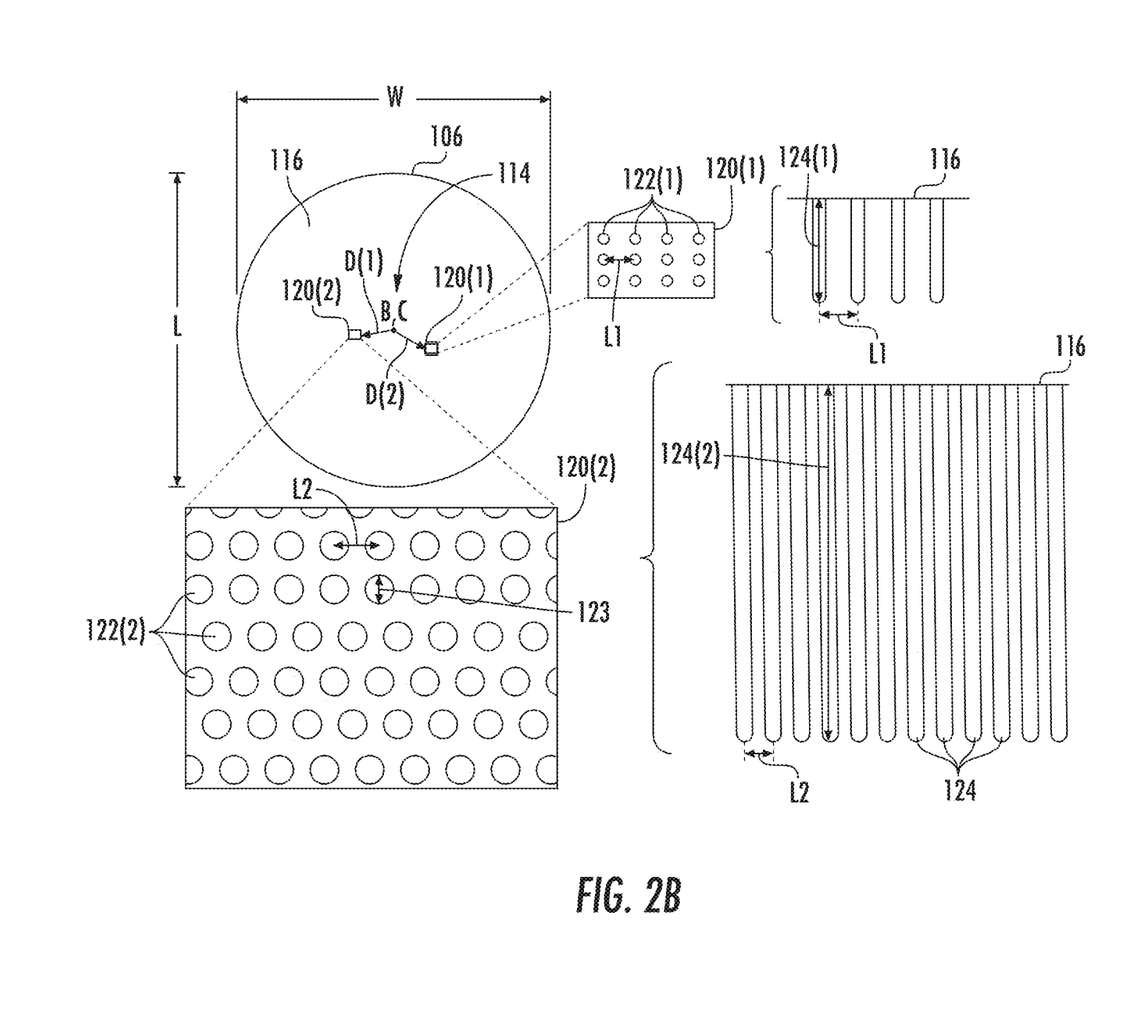
FIG. 2B is a block diagram of the planar corrector lens of FIG. 2A including a front view, close up views, and cross-sectional side views.

FIGS. 2A-2B are views of the planar corrector lens 108 of FIG. 1. Referring to FIG. 2A, the planar corrector lens 108 has a planar front surface 116 and a planar rear surface 118 with a thickness T of less than 10 mm (e.g., 0.5 mm). In certain embodiments, the thickness T is less than 5 mm, less than 2.5 mm, or less than 1 mm.

The planar corrector lens 108 includes any suitable optical material, and may be selected based on a particular wavelength, or band of wavelengths for which the optical system 100 is designed. For example, in certain embodiments, the planar corrector lens 108 includes silicon, silicon dioxide, sapphire, germanium, Cleartran™ (ZnS), zinc selenide (ZnSe), chalcogenide glasses (e.g., AMTIR-4, AMTIR-5, IRG24), and the like. As an example, with respect to IR wavelengths, the planar corrector lens 108 may include germanium, silicon, or the like. In one embodiment, the planar corrector lens 108 includes a glass-ceramic material that has multiple states, including an amorphous state and a crystalline state. The material has one refractive index when in the amorphous state and another refractive index when in the crystalline state. The material thereby forms a surface of the planar corrector lens 108 that may be altered to correct WFE associated with the conformal optical component 102. In particular, locations within the material can be targeted by an energy beam source, such as a laser, in accordance with a refractive index prescription, to alter the locations from the amorphous state to the crystalline state to thereby alter the refraction of index and correct WFE.

Referring to FIG. 2B, in one embodiment, a surface 116 is altered by forming openings in the surface 116 to alter the porosity of the surface 116 and thereby alter the refractive index of the surface. In certain embodiments, the planar corrector lens 108 may include a first portion 120(1) a distance D(1) from a lens axis B (at a center of the planar corrector lens 108) and a second portion 120(2) a distance D(2) from the lens axis B. For illustrative purposes, the distance D(1) is the same as distance D(2) from a center C. Further, the first portion 120(1) has a different refractive index than the second portion 120(2). In certain embodiments, the planar corrector lens 108 has refractive indices rotationally asymmetric about the lens axis B. In certain embodiments, the planar corrector lens 108 has refractive indices that are rotationally symmetric only about a 180° rotation. Compared to some conventional lenses, the planar corrector lens 108 has no requirement for rotational symmetry.

In certain embodiments, the first portion 120(1) includes openings 122(1) at a first filling fraction and a second portion 120(2) includes openings 122(2) at a second filling fraction (different than the first refractive index). The first portion 120(1) forms a plurality of first sub-wavelength openings 122(1) at a first filling fraction that alters a native refractive index of the surface 116 to a first desired refractive index. The second portion 120(2) forms a plurality of second sub-wavelength openings 122(2) at a second filling fraction that alters the native refractive index to a second desired refractive index (different from the first desired refractive index).

The diameter and/or depth of the first sub-wavelength openings 122(1) and the second sub-wavelength openings 122(2) may be the same or different. Further, the pitch L1 between the first sub-wavelength openings 122(1) may be the same or different from the pitch L2 between the second sub-wavelength openings 122(2). The combination of the diameter 123, a distance between the openings 122(1), 122(2) (referred to generally as openings 122), and a calculated depth 124(1), 124(2) are determined and then formed in the surface 116 to alter the porosity of the surface 116 such that the refractive index at various locations of the surface 116 is changed to reduce or eliminate WFE. In some embodiments, the diameter 123 may be less than about half the wavelength of the EMR of interest to minimize scattering.

The planar corrector lens 108 may have varying fill fractions and resulting indices of refraction across a length L and/or width W of the conformal optical component 102. In one embodiment, the sub-wavelength openings 122 are formed by directing a beam of energy at the surface 116 to imprint a mask of the sub-wavelength openings 122, although the embodiments are not limited to any particular mechanism of imprinting a mask. The beam of energy may include, by way of non-limiting example, an ion beam, e-beam lithography, or a laser beam. In certain embodiments, a lithographic manufacturing process may be used for a reduced cost in manufacturing. A subsequent chemical or physical etching processing step may then be performed to form the sub-wavelength openings 122 in accordance with the mask. In certain embodiments, an atomic layer deposition (ALD) layer is deposited on the sub-wavelength openings 122, or similar techniques.

Figure 3:
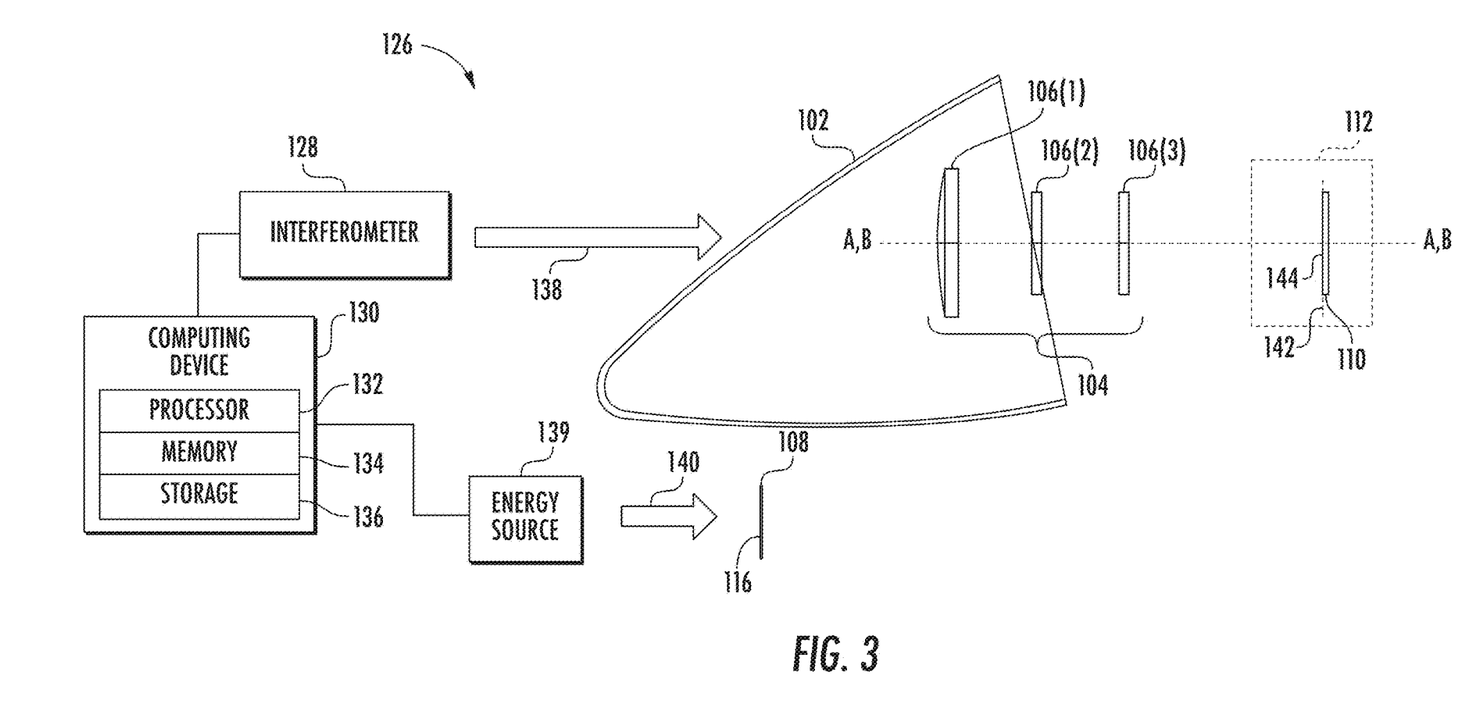
FIG. 3 is a block diagram of a wavefront error (WFE) correction apparatus illustrating identification and correction of a WFE.

FIG. 3 is a block diagram of a WFE correction apparatus 126. In certain embodiments, the WFE correction apparatus 126 includes an interferometer 128 configured to determine a WFE of an EMR downstream of the conformal optical component 102 and planar corrector lens 108 of FIG. 1. The planar corrector lens 108 defines a lens axis B. In certain embodiments, the planar corrector lens 108 has refractive indices rotationally asymmetric about the lens axis B. The EMR propagates through the conformal optical component 102 along a path axis A. The conformal optical component 102 is rotationally asymmetric about the path axis A.

In certain embodiments, the interferometer 128 uses a laser beam 138 to determine a WFE. A WFE may be determined by the interferometer 128 at, for example, an image plane 142 where a detector (e.g., a focal plane array 144) is positioned. Notably, determining the WFE at the image plane 142 will determine the cumulative, or aggregate, WFE caused by the conformal optical component 102 and the objective lens assembly 104. The interferometer 128 determines the WFE at the image plane 142, and the surface 116 of the planar corrector lens 108 will be altered to correct the WFE. The interferometer 128 provides data identifying the WFE, or data from which the WFE can be determined, to the computing device 130.

The interferometer 128 is capable of determining a WFE associated with the conformal optical component 102 and/or objective lenses 106. The interferometer 128 generates data, such as an interferogram, that quantifies the WFE in a particular format. While an interferometer will be discussed herein for purposes of illustration, the WFE determination component can comprise any device that is capable of determining a WFE associated with an optical element. For example, in certain embodiments, the modular transfer function (MTF) is measured and the WFE is determined based on the MTF (instead of or in addition to use of the interferometer 128).

The WFE correction apparatus 126 further includes a computing device 130 that receives and processes the data to determine a refractive index prescription that identifies changes to be made to the surface 116 of the planar corrector lens 108 to correct the WFE. The computing device 130 can include one or more microprocessors or processors 132, a memory 134, and storage 136. In particular, the processor 132 is configured to determine a refractive index prescription that reduces the wavefront error.

The WFE correction apparatus 126 further includes an energy source 139 configured to direct a beam of energy 140 at the surface 116 of a planar corrector lens 108 in accordance with the refractive index prescription to alter the surface 116 to change an index of refraction at multiple locations on the surface. In certain embodiments, refractive indices of the planar corrector lens 108 are rotationally asymmetric about the lens axis. In certain embodiments, the energy source 139 is an e-beam lithography system.

Figure 4:
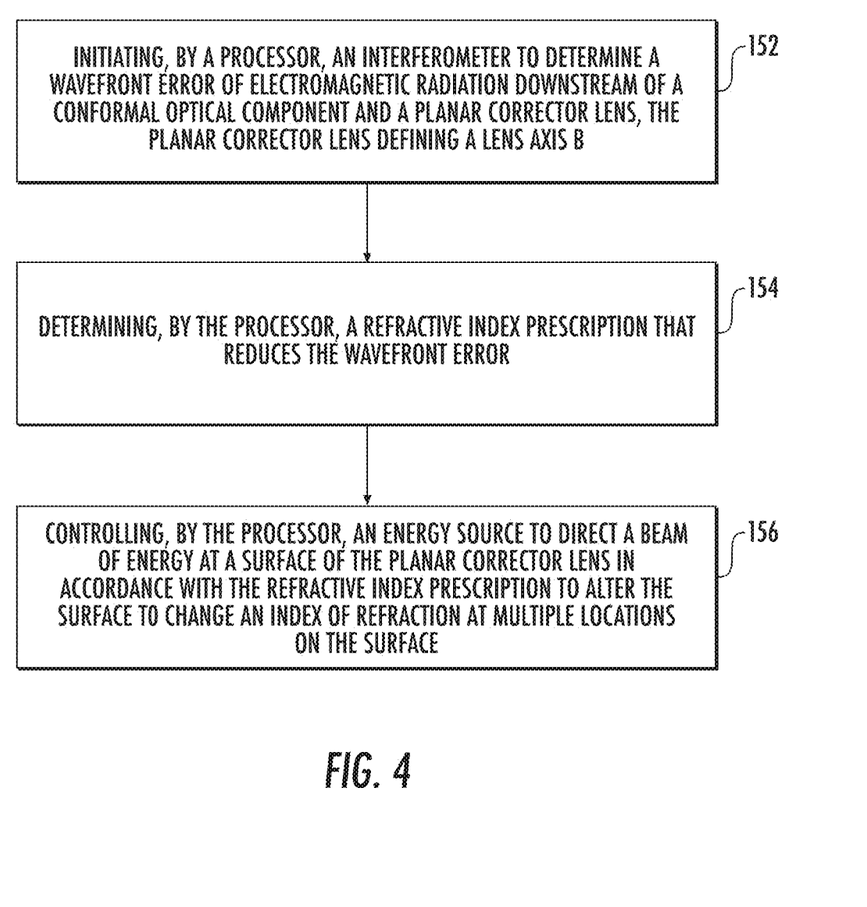
FIG. 4 is a flowchart of a method for altering a surface of a planar corrector lens of FIGS. 1-3 to correct for WFE.

FIG. 4 is a flowchart of a method for altering a surface of a planar corrector lens of FIGS. 1-3 to correct for WFE. In step 152, the method includes initiating, by a processor 132, an interferometer 128 to determine a WFE of EMR downstream of a conformal optical component 102 and a planar corrector lens 108, the planar corrector lens 108 defining a lens axis B. The EMR propagates through the conformal optical component 102 along a path axis A. The conformal optical component 102 is rotationally asymmetric about the path axis A.

In step 154, the method further includes determining, by the processor 132, a refractive index prescription that reduces the WFE.

In step 156, the method further includes controlling, by the processor 132, an energy source 146 to direct a beam of energy 148 at a surface 116 of the planar corrector lens 108 in accordance with the refractive index prescription to alter the surface 116 to change an index of refraction at multiple locations on the surface 116. In certain embodiments, the refractive indices of the planar corrector lens 108 are rotationally asymmetric about the lens axis B. In certain embodiments, the beam of energy 148 includes one of an ion beam and a laser beam.

Figure 5:
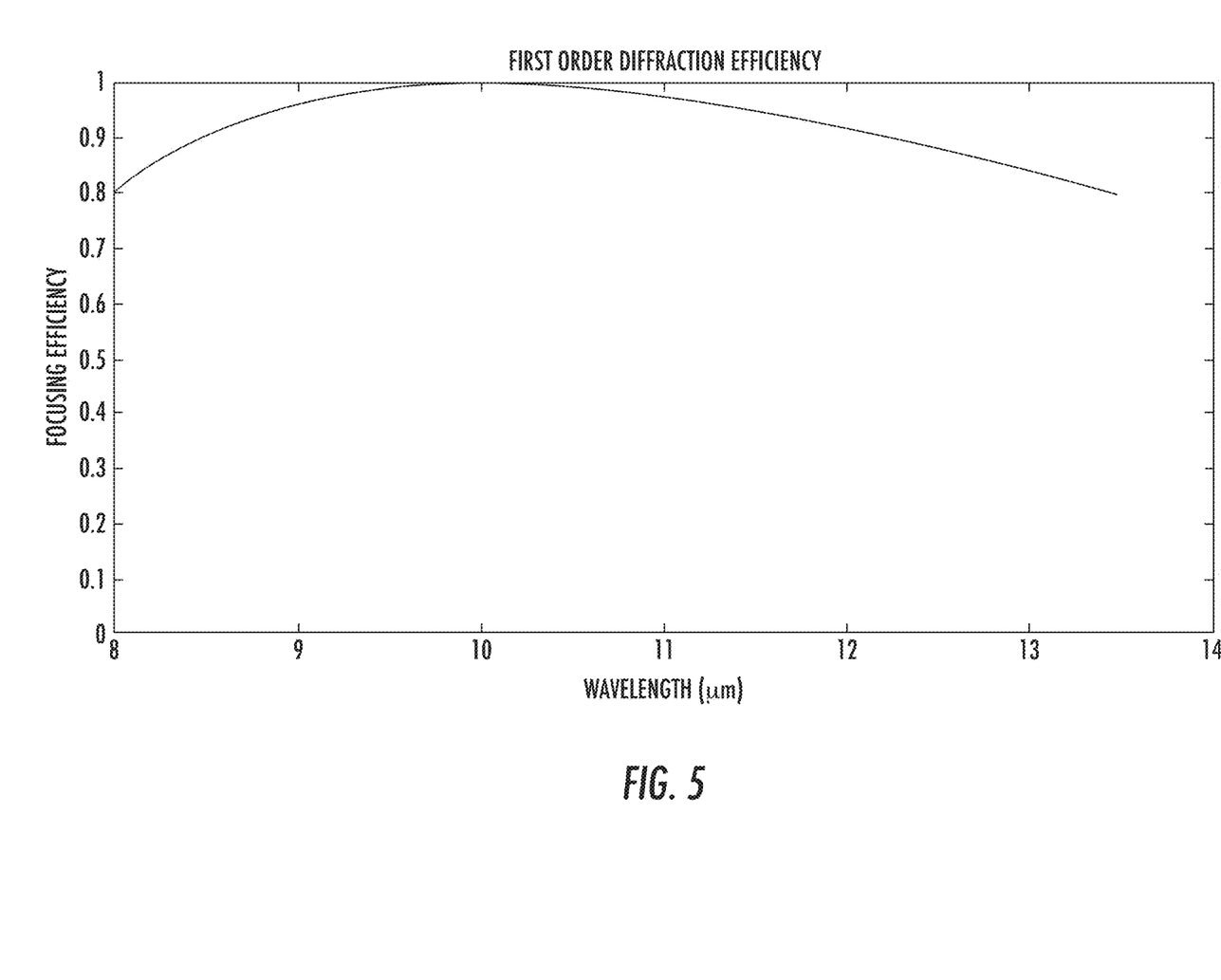
FIG. 5 is a chart illustrating first order diffraction efficiency of one embodiment of the planar corrector lens of FIGS. 1-3.

FIG. 5 is a chart illustrating the first order diffraction efficiency of the planar corrector lens 108 of FIGS. 1-3. It is noted that although the planar corrector lens 108 may be optimized for a particular wavelength, in certain embodiments, the planar corrector lens 108 provides broadband efficiency across multiple wavelengths. For example, in one embodiment, the planar corrector lens 108 has a 10 μm thick phase mask on a 0.5 mm Germanium wafer (may also be referred to as a substrate). The planar corrector lens 108 is optimized for 10 μm wavelength of LWIR, but still has a focusing efficiency above 80% within the wavelength range of 8 μm to 13 μm. Further, in the chart shown, for example, the openings are 300 nm holes with varying spacing.

Figure 6A:
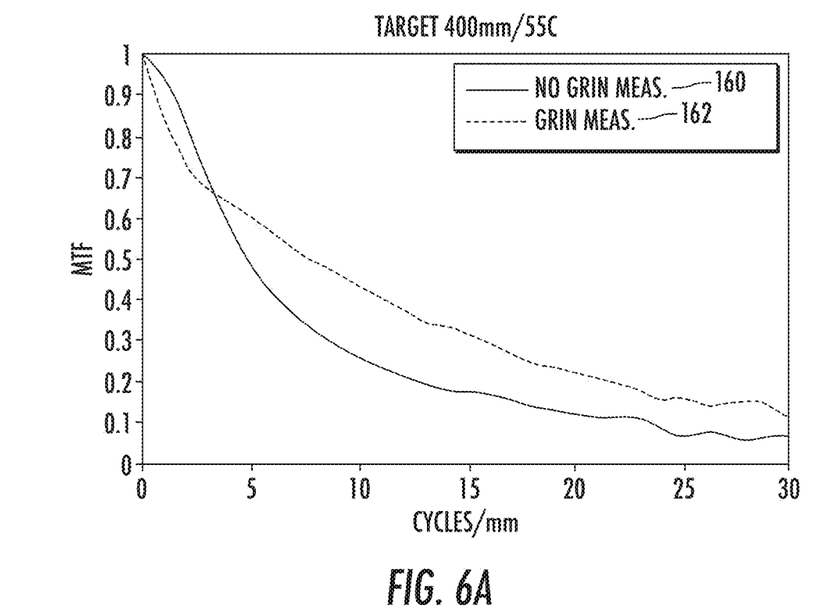
FIG. 6A is a chart illustrating improvement in the modulation transfer function over a range of wavelengths using one embodiment of the planar corrector lens of FIGS. 1-3.

FIG. 6A is a chart illustrating improvement in the modulation transfer function over a range of wavelengths using the planar corrector lens 108 of FIGS. 1-3. The chart provides the modulation transfer function (MTF) theoretical and actual measurements for optical systems with and without the planar corrector lens 108. It is noted that MTF is a measurement of sharpness of an image. Illustrated are the measured MTF with the planar corrector lens 160 and measured MTF with the planar corrector lens 162. It should be noted that, in this embodiment, ghosting was included in the analysis of this particular planar corrector lens 160 since no anti-reflection coating was applied to the planar corrector lens 160. In certain embodiments, an anti-reflection coating is applied to the planar corrector lens 160. As illustrated, use of the planar corrector lens 108 provided both theoretical and measured improvements.

Figure 6B:
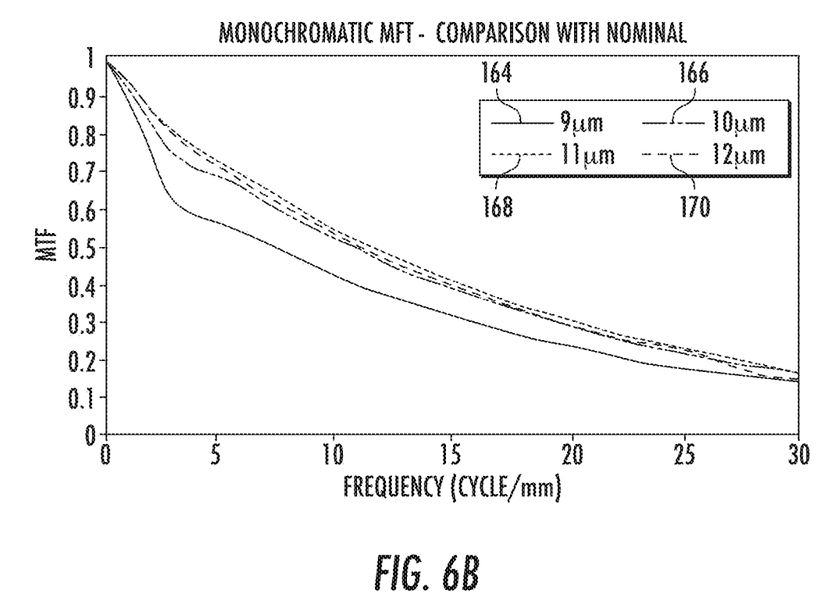
FIG. 6B is a chart illustrating improvement in the modulation transfer function at particular wavelengths using one embodiment of the planar corrector lens of FIGS. 1-3.

FIG. 6B is a chart illustrating improvement in the modulation transfer function at particular wavelengths using the planar corrector lens 108 of FIGS. 1-3. In particular, illustrated are measured MTF at 9 μm 164, measured MTF at 10 μm 166, measured MTF at 11 μm 168, and measured MTF at 12 μm 170.

Figure 7:
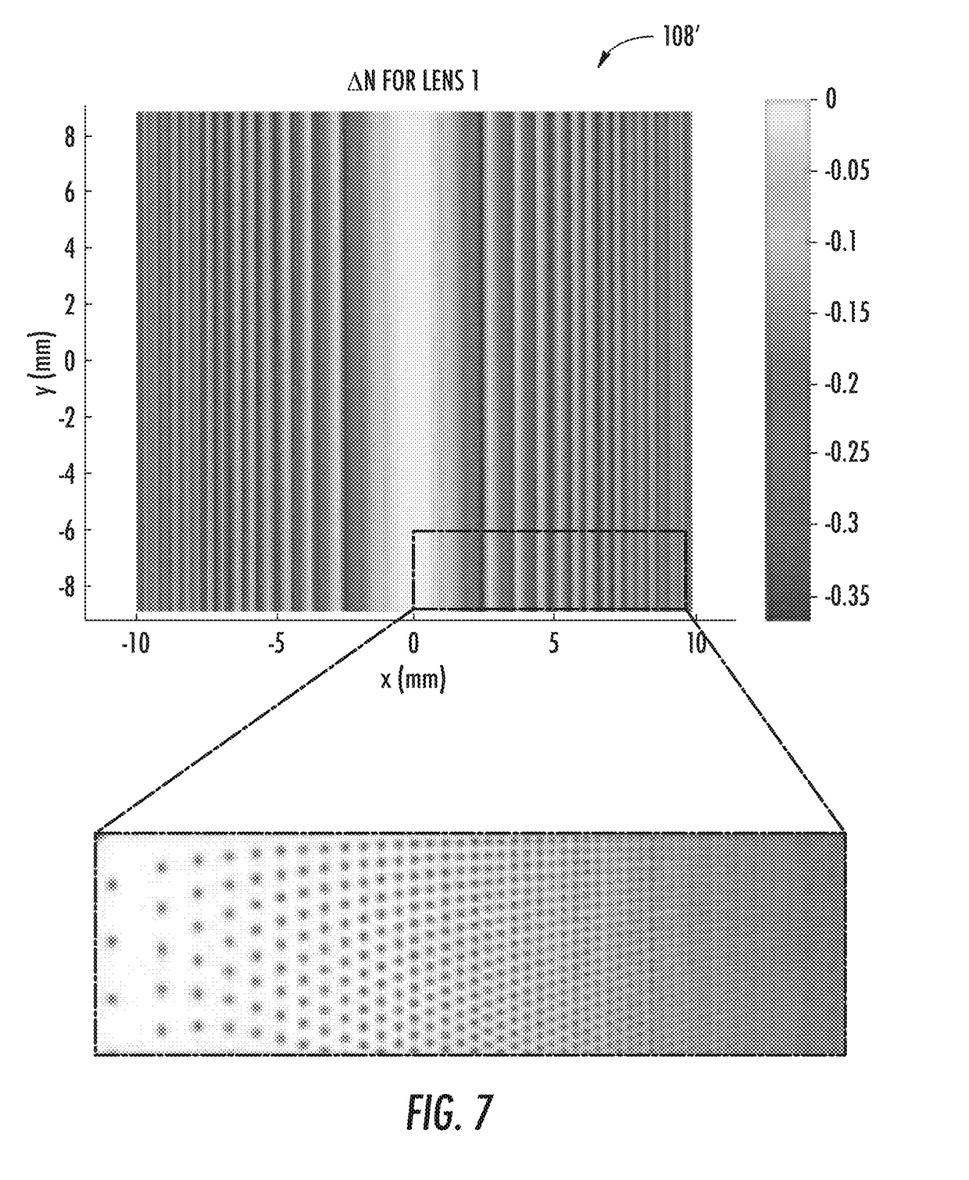
FIG. 7 is a diagram illustrating a design for a cylindrical planar corrector lens for correcting a mid-wave infrared (MWIR) radiation conformal dome.

FIG. 7 is a diagram illustrating a design for a planar corrector lens 108' with a cylindrical profile, for correcting a MWIR conformal dome. As shown, the density of the openings changes across a length of the planar corrector lens 108' to vary the refractive index across the length of the planar corrector lens 108'.

Figure 8A:
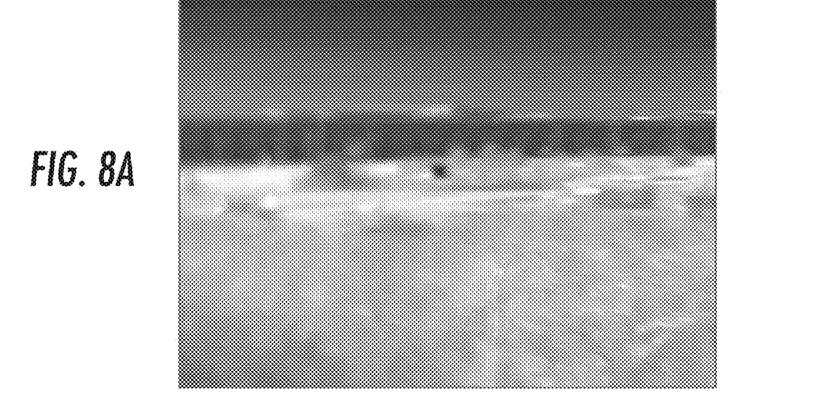
FIG. 8A is an image taken using the MWIR conformal dome of FIG. 7.
Figure 8B:
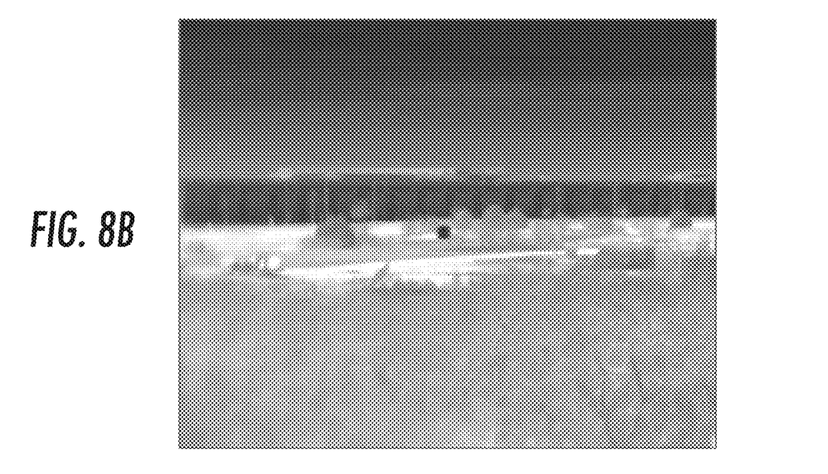
FIG. 8B is an image taken using the MWIR conformal dome and a traditional cylindrical corrector lens.
Figure 8C:
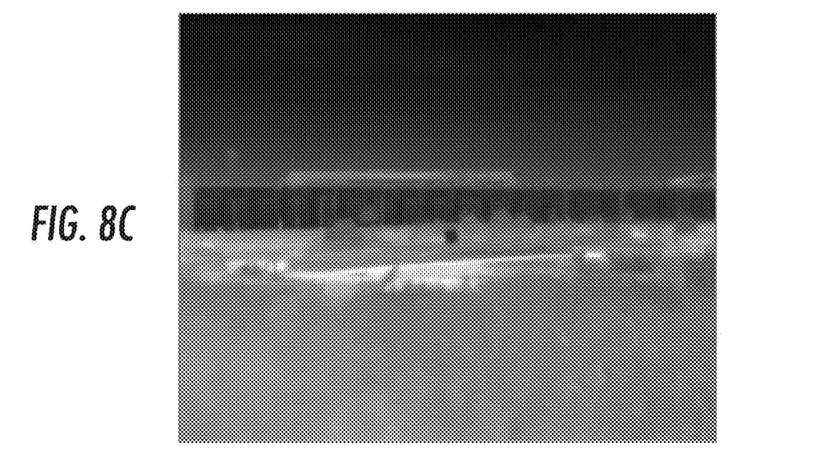
FIG. 8C is an image taken using the MWIR conformal dome and the planar corrector lens of FIGS. 1-3.

FIG. 8A is an image taken using the MWIR conformal dome of FIG. 7. FIG. 8B is an image taken using the MWIR conformal dome and a traditional cylindrical corrector lens. FIG. 8C is an image taken using the MWIR conformal dome and the planar corrector lens 108 of FIGS. 1-3. The image taken in FIG. 8C using the MWIR conformal dome provides a sharper image compared with the images of FIGS. 8A and 8B, and removes aberrations through the conformal dome.

Figure 9:
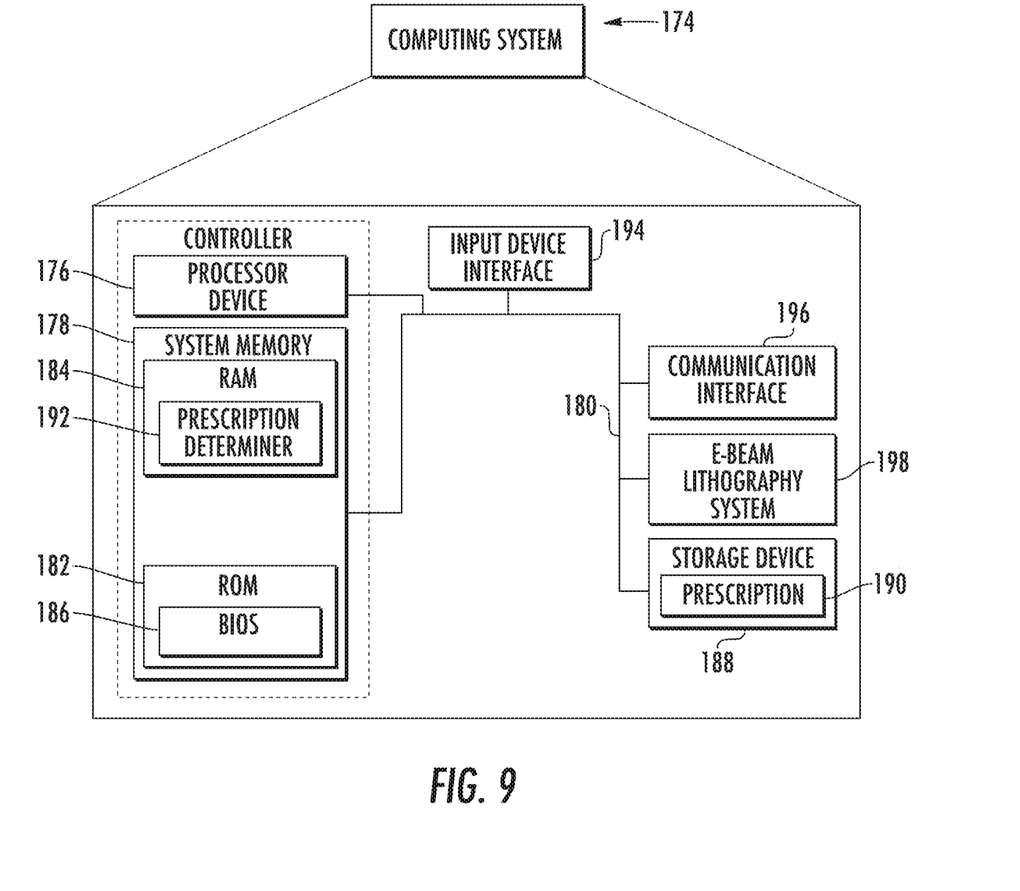
FIG. 9 is a block diagram of a system suitable for customizing the refractive index of a surface according to one embodiment.

FIG. 9 is a block diagram of a system 174 suitable for customizing the refractive index of a surface according to one embodiment. The system 174 may comprise one or more discrete computing devices. The system 174 includes a processor device 176, a system memory 178, and a system bus 180. The system bus 180 provides an interface for system components including, but not limited to, the system memory 178 and the processor device 176. The processor device 176 can be any commercially available or proprietary processor.

The system bus 180 may be any of several types of bus structures that may further interconnect to a memory bus (with or without a memory controller), a peripheral bus, and/or a local bus using any of a variety of commercially available bus architectures. The system memory 178 may include non-volatile memory 182 (e.g., read-only memory (ROM), erasable ROM (EPROM), electrically EPROM (EEPROM), etc.), and volatile memory 184 (e.g., RAM). A basic input/output system (BIOS) 186 may be stored in the non-volatile memory 182 and can include the basic routines that help to transfer information among elements within the system 174. The volatile memory 184 may also include a high-speed RAM, such as static RAM, for caching data.

The system 174 may further include or be coupled to a non-transitory computer-readable storage medium such as a storage device 188, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 188 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples. The storage device 188 may contain one or more prescriptions 190 that identify how a surface should be modified. For example, a prescription 190 may identify the particular filling fraction, diameter, and pitch of sub-wavelength openings that should be formed in a surface of an optical component, for each of a plurality of different surface portions of the optical component.

A number of modules can be stored in the storage device 188 and in the volatile memory 184, including a prescription determiner 192 that implements the mechanisms discussed above with respect to FIG. 3A to determine a prescription 190. All or a portion of the examples may be implemented as a computer program product stored on a transitory or non-transitory computer-usable or computer-readable storage medium, such as the storage device 188, which includes complex programming instructions, such as complex computer-readable program code, to cause the processor device 176 to carry out the steps described herein. Thus, the computer-readable program code can comprise software instructions for implementing the functionality of the examples described herein when executed on the processor device 176. The processor device 176 may serve as a controller, or control system, for the system 174 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 176 through an input device interface 194 that is coupled to the system bus 180 but can be connected by other interfaces, such as a parallel port, a serial port, a Universal Serial Bus (USB) port, an IR interface, and the like.

The system 174 may also include a communication interface 196 suitable for communicating with a network as appropriate or desired. The system 174 may also include an e-beam lithography system 198 suitable for accessing a prescription 190 and, in accordance with the prescription 190, form a plurality of sub-wavelength openings in a surface of an optical component to alter one or more portions of the surface from a native refractive index to a desired refractive index.

Those skilled in the art will recognize improvements and modifications to the preferred embodiments of the disclosure. All such improvements and modifications are considered within the scope of the concepts disclosed herein and the claims that follow.

What is claimed is:

1. An optical system, comprising:
a conformal optical component transmissive to electromagnetic radiation (EMR);
objective lenses that pass the EMR propagated through the conformal optical component along a path axis; and
a single planar corrector lens that passes the EMR propagated through the conformal optical component and the objective lenses along the path axis to a detector and configured to correct a wavefront error (WFE) of the EMR propagated through the conformal optical component and the objective lenses along the path axis through the single planar corrector lens to the detector, the single planar corrector lens defining a lens axis and the conformal optical component is rotationally asymmetric about the path axis at a point where the path axis crosses the corrector lens.

2. The optical system of claim 1, wherein the conformal optical component comprises a conformal optical window.

3. The optical system of claim 1, wherein the conformal optical component comprises a conformal dome.

4. The optical system of claim 1, wherein the EMR is from at least one of mid-wave infrared (MWIR) band of wavelengths in the range of 3 μm to 5 μm or long-wave infrared (LWIR) band of wavelengths in the range of 8 μm to 14 μm.

5. The optical system of claim 1, wherein the lens axis is aligned with the path axis.

6. The optical system of claim 1, wherein the planar corrector lens comprises a gradient-index (GRIN) lens.

7. The optical system of claim 6, wherein the GRIN lens comprises a GRIN surface etched onto a substrate.

8. The optical system of claim 6, wherein the GRIN lens comprises a GRIN coating attached to a substrate.

9. The optical system of claim 1, wherein the planar corrector lens comprises a thickness of less than 10 mm.

10. The optical system of claim 1, wherein the planar corrector lens comprises a thickness of 0.5 mm.

11. A method for correcting a wavefront error (WFE), comprising:
initiating, by a processor, an interferometer to determine a WFE of electromagnetic radiation (EMR) downstream of a conformal optical component, objective lenses, and a planar corrector lens, the planar corrector lens defining a lens axis, the EMR propagated through the conformal optical component and objective lenses along a path axis through the planar corrector lens, the conformal optical component has a rotationally symmetric shape and in a rotationally asymmetric orientation about the path axis at a point where the path axis crosses the corrector lens;
determining, by the processor, a refractive index prescription of the planar corrector lens that reduces the WFE; and
controlling, by the processor, an energy source to direct a beam of energy at a surface of the planar corrector lens in accordance with the refractive index prescription to alter the surface to change an index of refraction at multiple locations on the surface.

12. The method of claim 11, wherein the conformal optical component comprises a conformal optical window.

13. The method of claim 11, wherein the conformal optical component comprises a conformal dome.

14. The method of claim 11, wherein the EMR is from at least one of mid-wave infrared (MWIR) band of wavelengths in the range of 3 μm to 5 μm or long-wave infrared (LWIR) band of wavelengths in the range of 8 μm to 14 μm.

15. The method of claim 11, wherein the planar corrector lens is a single lens.

16. The method of claim 11, wherein the planar corrector lens comprises a gradient-index (GRIN) lens.

17. The method of claim 11, wherein the planar corrector lens comprises a thickness less than 10 mm.

18. A system for wavefront error (WFE) correction, comprising:
an interferometer configured to determine a WFE of an electromagnetic radiation (EMR) downstream of a conformal optical component, objective lenses, and a single planar corrector lens, the single planar corrector lens defining a lens axis, the EMR propagated through the conformal optical component and objective lenses along a path axis through the single planar corrector lens, the conformal optical component rotationally asymmetric about the path axis at a point where the path axis crosses the corrector lens;
a processor configured to determine a refractive index prescription of the single planar corrector lens that reduces the WFE; and
an energy source configured to direct a beam of energy at a surface of the single planar corrector lens in accordance with the refractive index prescription to alter the surface to change an index of refraction at multiple locations on the surface.

19. The system of claim 18,
wherein the conformal optical component comprises a conformal dome;
wherein the EMR is from at least one of mid-wave infrared (MWIR) band of wavelengths in the range of 3 μm to 5 μm or long-wave infrared (LWIR) band of wavelengths in the range of 8 μm to 14 μm;
wherein the planar corrector lens comprises a gradient-index (GRIN) lens; and
wherein the planar corrector lens comprises a thickness of less than 10 mm.

* * * * *